United States Patent [19]

Miyaura et al.

[11] Patent Number: 4,669,334
[45] Date of Patent: Jun. 2, 1987

[54] TRANSMISSION CONTROL APPARATUS FOR INFINITELY VARIABLE TRANSMISSION

[75] Inventors: Yasuhiko Miyaura, Gumma; Hisashi Machida, Maebashi, both of Japan

[73] Assignee: Nippon Seiko Kabushiki Kaisha, Tokyo, Japan

[21] Appl. No.: 775,487

[22] Filed: Sep. 12, 1985

[30] Foreign Application Priority Data

Sep. 14, 1984 [JP] Japan ................................. 59-193652
Sep. 28, 1984 [JP] Japan ................................. 59-203488
Sep. 28, 1984 [JP] Japan ................................. 59-203489

[51] Int. Cl.[4] ............................................. B60K 41/06
[52] U.S. Cl. .................................... 74/866; 364/424.1
[58] Field of Search .......................... 74/866, 865, 867; 364/424.1

[56] References Cited

U.S. PATENT DOCUMENTS 4,536,171 8/1985 Tanaka et al. ......................... 74/862
4,561,327 12/1985 Niwa et al. ........................ 364/424.1

FOREIGN PATENT DOCUMENTS 139277 5/1985 European Pat. Off. ......... 364/424.1
2147373 5/1985 United Kingdom ............. 364/424.1

Primary Examiner—Allan D. Herrmann
Assistant Examiner—Martin G. Belisario
Attorney, Agent, or Firm—Basile, Weintraub & Hanlon

[57] ABSTRACT

A transmission control apparatus for an infinitely variable transmission in which a transmission operating amount is selected by a transmission operating amount selecting system from a memory stored table based on transmission control information from transmission control information detectors which detect the transmission control information such as a throttle opening position command signal, etc., and a driving motor which enables the transmission operation of the infinitely variable transmission to be controlled in an open-loop fashion by a transmission control system in accordance with the transmission operating amount. The transmission operating amount selected by the transmission operating amount selecting system is compared with a predetermined set value by a transmission operating amount decision system to decide whether or not the transmission operating amount is equal to or larger than the predetermined set value, and based on the decision result, the driving motor is driven to rotate by a driving speed selecting system such that, for example, at the time of usual transmission in which the operating amount is small, the driving motor is driven at a low speed, whereas at the time of rapid acceleration or kick down in which the operating amount is large, the driving motor is driven at a high speed.

6 Claims, 8 Drawing Figures

TRANSMISSION CONTROL APPARATUS FOR INFINITELY VARIABLE TRANSMISSION

BACKGROUND OF THE INVENTION

1. Field of the Invention

The present invention relates to a transmission control apparatus for an infinitely variable transmission in which the transmission control is performed in an open-loop fashion based on transmission control information including a throttle opening position, a vehicle speed, and the like.

2. Description of the Prior Art

A prior art transmission control apparatus of an infinitely variable transmission is disclosed, for example, in U.S. Pat. No. 4,434,675.

This control apparatus is arranged such that a roller supporting body is moved by mechanically manipulating a main control valve in accordance with the position of the accelerating pedal and a negative pressure from the intake manifold, and a desired transmission ratio is obtained by tilting power rollers to desired positions by mechanically feeding back the movement position of the roller supporting body to the main control valve by means of a precess cam.

However, in this prior art control apparatus there are problems in that because it is designed to mechanically transmit the position of the accelerator pedal and the manifold pressure to the main control valve, the control mechanism tends to become large and complicated, and further, because it is unable to perform sophisticated control based on various transmission control information, optimum transmission control adapted to a vehicle running condition cannot be achieved. Moreover, since the control is effected by hydraulic and mechanical means, the transmission ratio is varied due to changes in hydraulic pressure caused by changes in fluid temperature, and thus transmission operation with high precision is impossible. Furthermore, since the control is basically intended to maintain constant engine speed, comfortable ride in the vehicle is not necessarily provided.

OBJECT OF THE INVENTION

A primary object of the present invention is to provide a transmission control apparatus for an infinitely variable transmission capable of precisely controlling the infinitely variable transmission by electrically controlling the transmission operation in an open-loop fashion, and by performing a sophisticated control based on various transmission control information.

Another object of the present invention is to provide a transmission control apparatus for an infinitely variable transmission capable of performing a transmission control optimum to vehicle running conditions by controlling the driving speed of a driving motor which performs the transmission operation in accordance with a transmission operating amount calculated based on transmission control information.

Still another object of the present invention is to provide a transmission control apparatus for an infinitely variable transmission capable of precise transmission control by accurately correcting a deviation of a transmission operating position caused by step-out, disturbance, and the like, in case of controlling a driving motor in an open-loop fashion, which driving motor performs the transmission operation of the infinitely variable transmission.

SUMMARY OF THE INVENTION

According to the present invention, the transmission control apparatus is arranged so that operating amount selecting means selects a transmission operating amount per one time based on transmission control information, and transmission control means, in accordance with the transmission operating amount, electronically controls a driving motor which performs the transmission operation. Therefore, an overall structure can be made simple and small in size, and the infinitely variable transmission can be controlled finely according to the vehicle running condition at that time, and thus, comfortable ride, feelings in the vehicle running can be maintained in a good condition.

Further, by controlling the driving speed of the driving motor variably, it is possible according to the vehicle running condition at that time to effectively utilize the opposite characteristics between the rotational speed fluctuation in the input side and the response, and between the torque fluctuation in the input side and the response, and thus optimum feelings in the vehicle running can be insured.

Moreover, the control precision in the case of an open-loop control can be improved to a great extent by detecting a maximum decelerating position of the infinitely variable transmission by a maximum speed-decreasing position detector, and by correcting a control origin by correcting means based on the detection signal. In addition, since the control origin is corrected at the maximum speed-decreasing position of the infinitely variable transmission, for example, where the infinitely variable transmission is used for vehicles, the correction of the control origin can be made each time the vehicle stops, and thus the transmission operation of the vehicle can be achieved accurately.

DESCRIPTION OF THE PREFERRED EMBODIMENTS

Hereinafter, embodiments of the present invention will be described with reference to the drawings.

Figure 1:
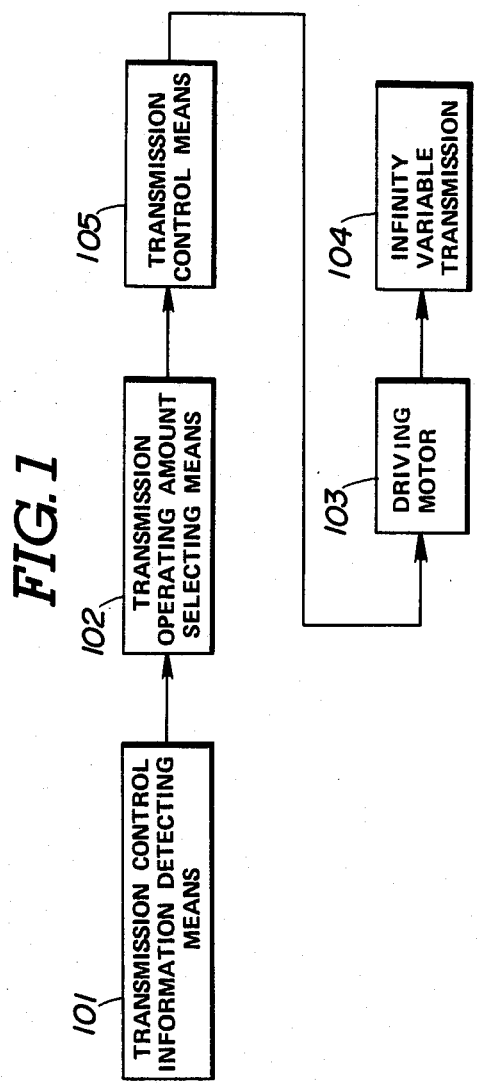
FIG. 1 is a block diagram of a basic arrangement showing a general concept of the present invention.

First, the general concept of the invention will be described with reference to FIG. 1.

The present invention is, basically, comprised of transmission control information detecting means 101 for detecting transmission control information including a throttle opening position command signal, etc., transmission operating amount selecting means 102 for selecting a transmission operating amount from a transmission control information-transmission operating amount conversion storage table based on the transmission control information from the transmission control information detecting means 101, and transmission control means 105 for controlling the infinitely variable transmission 104 in an open-loop fashion by operating a driving motor 103 in accordance with the transmission operating amount selected by the transmission operating amount selecting means 102.

Next, an embodiment of the invention will be described with reference to FIGS. 2 to 5.

Figure 2:
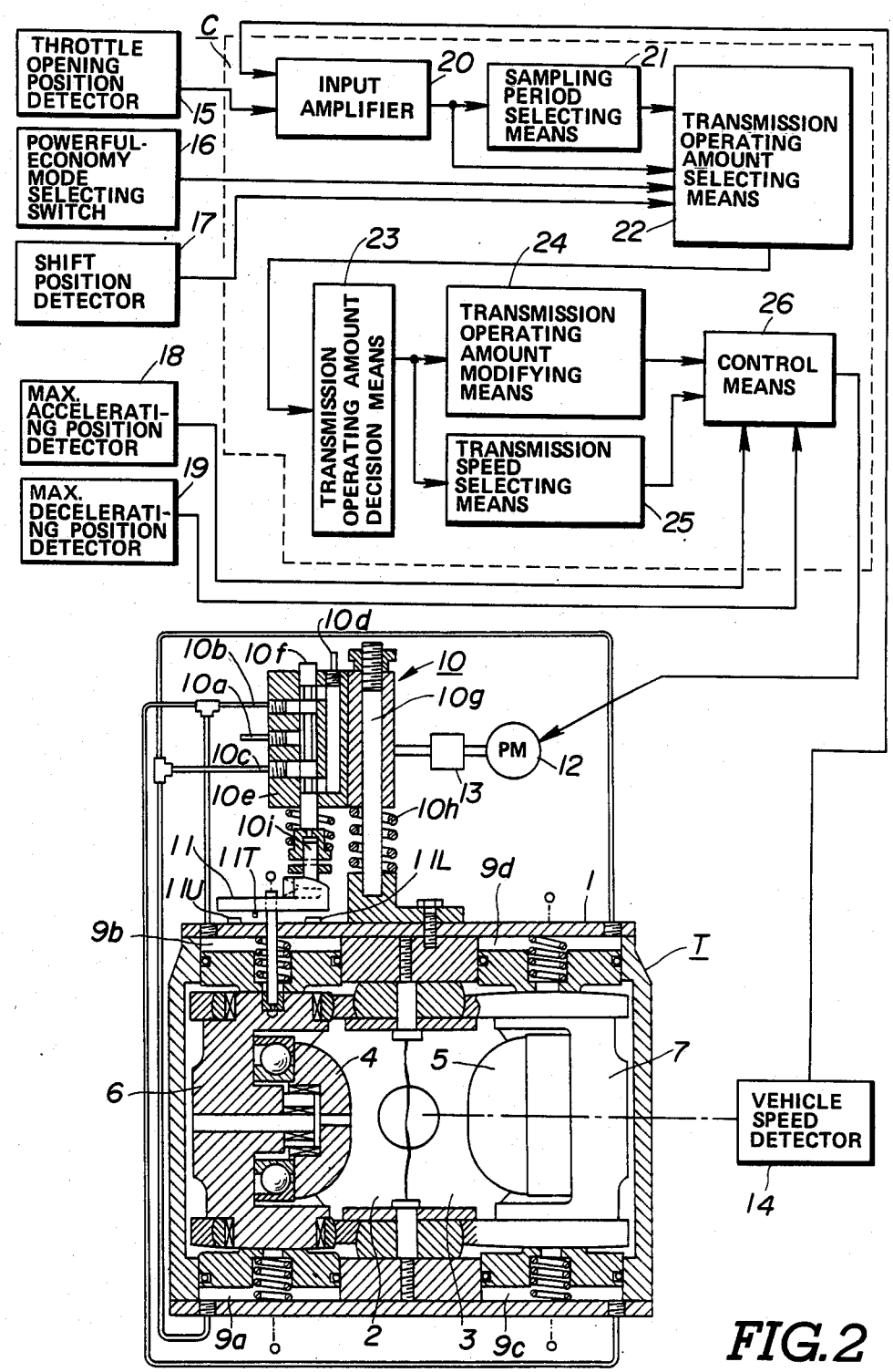
FIG. 2 is a general arrangement diagram showing a first embodiment of the invention.
Figure 3:
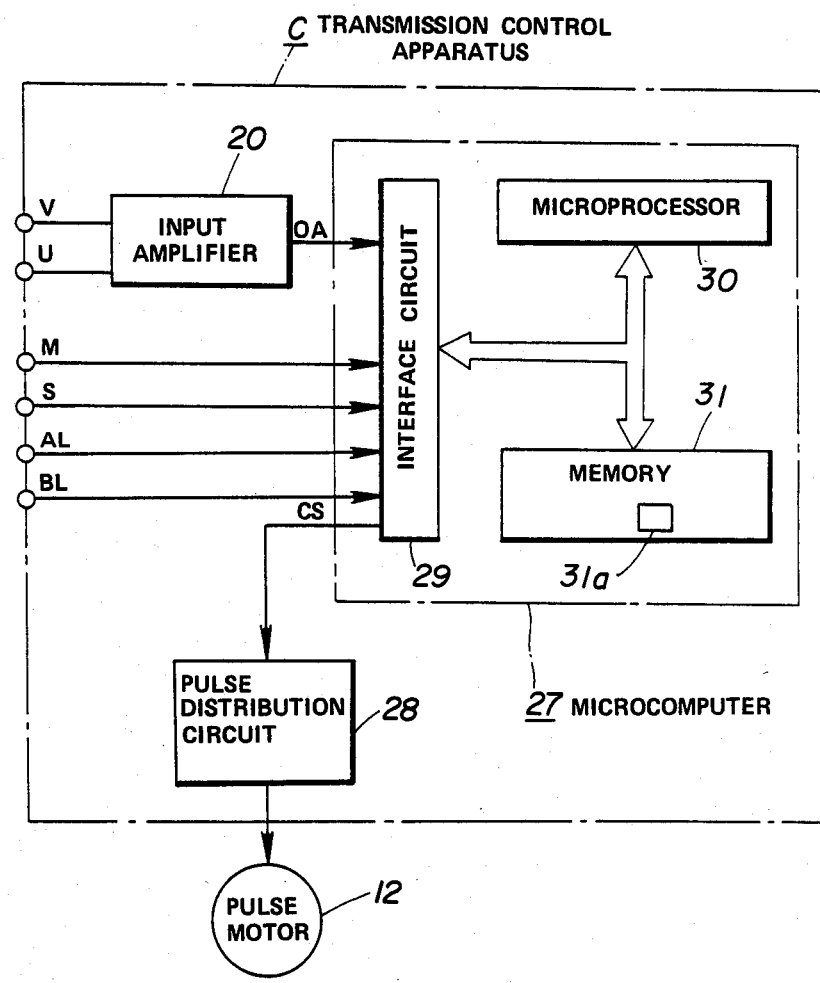
FIG. 3 is a block diagram of an example of a control apparatus applicable to the present invention.

In FIGS. 2 and 3, reference T generally designates a toroidal type infinitely variable transmission and reference C generally designates a computerized control apparatus.

Transmission T is provided with an input disk 2 and an output disk 3 mounted in a housing 1 in coaxial opposition to each other. The input disk 2 and output disk 3 are of an identical shape to each other and are disposed in line symmetry, so that toroidal surfaces are formed having a semi-circular cross-section in the axial direction by opposing faces of the input and output disks 2, 3 cooperating with each other. Within the toroidal cavity formed by the toroidal surfaces of input disk 2 and output disk 3, there are tiltably disposed with a pair of power rollers 4, 5 which are rotatively engaged with both the disks 2, 3. Power rollers 4, 5 are rotatably mounted on trunnion 6, 7 respectively, and are also supported pivotally with respect to a pivot axis O which is also the center of the toroidal surfaces formed by the input disk 2 and output disk 3.

A viscous material having a high frictional resistance is coated on the contact surfaces between input disk 2 and power roller 4 and between output disk 3 and power roller 5, and rotary power imparted to the input disk 2 is transmitted to the output disk 3 through the power rollers 4, 5. The transmission ratio is changed by changing the tilting angle $\theta$ of each of the power rollers 4, 5 by moving the trunnions 6, 7 by a minute distance in the direction of the pivot axis O—O. The movements of the trunnions 6, 7 are controlled by a moving mechanism 12 composed of hydraulic cylinders 9a to 9d respectively provided at opposite ends of the trunnions 6, 7, a spool control valve 10 for controlling fluid supply to the hydraulic cylinders 9a to 9d. A precess cam 11 is formed integrally with the trunnion 6.

The spool control valve 10 includes a main valve body 10e having an inlet port connected to a fluid supply pipe 10a, an outlet port connected to distribution pipes 10b and 10c, and an exhaust port connected to a fluid exhaust pipe 10d. A valve spool 10f is located within main body 10e for vertical sliding movement. Main body 10e is slidably supported on a strut 10g fixed to the outer surface of the housing 1 of the infinitely variable transmission T, and is biased upwardly along strut 10g by a return spring 10h. By driving and rotating a screw 13 parallel with the strut 10g, the valve main body 10e is moved vertically on strut 10g.

Spool 10f engages a cam surface of the precess cam 11 via an engagement roller 10f. Spool 10f is vertically moved by cam 11 upon rotation of trunnion 6. Trunnion 6, precess cam 11, and spool 11f constitute a mechanical feedback means.

Distribution pipe 10b is connected to hydraulic cylinders 9a and 9d, and distribution pipe 10c is connected to hydraulic cylinders 9b and 9c.

The main valve body 10e of valve 10 is coupled to a pulse motor 12 through transmission means 13 such as a screw, or the like which converts the rotary motion of motor 12 into linear movement, and valve body 10e is vertically moved in accordance with the rotation of the pulse motor 12 against the return spring 10h.

Reference numeral 14 designates a vehicle speed detector for generating signal representative of vehicle speed by monitoring the rotation of output disk 3.

Reference numeral 15 designates a throttle opening position detector for generating a signal U indicative of a throttle opening position, 16 designates a powerful-economy mode selection switch, 17 designates a shift position detector for generating a signal S indicative of a shift position, and 18 and 19 designate limit position detectors disposed in the vicinity of the precess cam 11 for respectively detecting a maximum accelerating position and a maximum decelerating position of the power roller 4.

Control apparatus C is comprised of an input amplifier 20 supplied with various detection signals as the transmission control information which serves as a reference in selecting a transmission ratio, sampling period selecting mean 21, transmission operating amount selecting means 22, transmission operating amount decision means 23, operating amount modifying means 24, transmission speed selecting means 25, and control means 26.

A more general arrangement of control apparatus C, as shown in FIG. 3, includes the input amplifier 20; a microcomputer constituted by sampling period selecting means 21, the transmission operating amount selecting means 22, transmission operating amount decision means 23, operating amount modifying means 24, transmission speed selecting means 25, and control means 26; and a pulse distribution circuit 28 for driving the pulse motor 12.

The input amplifier 20 is supplied with the throttle opening position detection signal U from the throttle opening position detector 15 and the detection signal V from the vehicle speed detector 14 as the transmission control information which serves as the reference for selecting the transmission ratio, and input amplifier 20 amplifies and transmits these signals to an interface circuit 29.

The microcomputer 27 is constituted by interface circuit 29, a microprocessor 30, and a memory 31, and based on input signals supplied to the interface circuit 29, calculates a command operating amount Ln, selects an optimum speed of the rotational speed of the pulse motor in accordance with the command operating amount, calculates a number of driving pulses according to the optimum speed, and transmits via interface circuit 29 a driving control signal CS for driving the pulse motor 12 by distributing the pulses.

The interface circuit 29 is provided with A/D conversion and D/A conversion functions, and is supplied at the input side thereof with a shift position detection signal S from the shift position detector 17, a selection signal M from the powerful-economy mode selection switch 16, an output signal OA of the input amplifier 20, and detection signals AL and BL of the max. accelerating and max. decelerating position detector 18 and 19 respectively detecting accelerating side limit position and decelerating side limit position of the power rollers 4, 5. At the output side of the interface circuit 29, there is connected with the pulse distribution circuit 28 for driving the pulse motor 12.

The microprocessor 30 executes the calculation and processing based on the input signals supplied to the interface circuit 29 and in accordance with a predetermined processing program stored in the memory 31 beforehand, and ultimately generates the drive control signal CS for the pulse motor 12 to driving the trunnions 6, 7 of the toroidal type infinitely variable transmission T.

The memory 31 stores processing programs required to perform the calculation and processing of the microprocessor 30, and at the same time, stores various constants required in the course of the processing by the microprocessor 30, and further sequentially stores the processing results produced in the course of the processing by the microprocessor 30.

Next, referring to FIG. 4, the processing procedures of the microprocessor 30 will be described.

In step ①, a standard set value $\tau$ is read, to establish a sampling period set beforehand, and this set value $\tau$ is stored temporarily in a sampling period storage area in the memory 31.

Next, in step ②, the vehicle speed detection signal V of the vehicle speed detector 14 and the detection signal U of the throttle opening position detector 15 are respectively read and stores these signals as a vehicle speed detection value V and a throttle opening position detection value U in a predetermined storage area in the memory 31. In step ③, it is determined whether or not the vehicle detection value V exceeds a vehicle speed set value $V_{S1}$ of a relatively low speed, and when $V > V_{s1}$, step ④ is initiated.

In step ④, it is determined whether or not the vehicle set value V is equal to or larger than a vehicle speed set value $V_{S2}$ which is larger than the vehicle set value $V_{s1}$ mentioned above, and when $V \geq V_{S2}$, the process proceeds to step ⑤.

In step ⑤, it is determined whether or not the throttle opening position detection value U is equal to or larger than a predetermined set value $U_{S1}$. The decision in this case is to decide whether or not the vehicle is in a high speed cruise running condition, and if $U \geq U_{S1}$, step ⑥ is initiated.

In step ⑥, a set value $2\tau$ obtained by doubling the standard set value $\tau$ is stored in the sampling period set value storage area in the memory 31 temporarily as a sampling period set value $\tau_S$, step ⑦ is initiated.

In step ⑦, a timer interruption period Tm for carrying out the sampling is calculated by multiplying the sampling period set value $\tau_S$ stored in the sampling period set value storage area by a predetermined time (1 msec), and the timer interruption period Tm is stored in a timer interruption period storage area in the memory 31, and step ⑧ is initiated. In step ⑧, it is decided whether or not the control is to be terminated. If the control is to be continued, the process returns to step ①.

If the result of the decision in step ③ is that $V \leq V_{S1}$, the process proceeds from step ③ directly to step ⑨, and it is determined whether or not the throttle opening position detection value U is equal to or larger than the predetermined set value $U_{S1}$. The decision in this case decides whether or not the vehicle is in a rapid accelerating condition in a low vehicle speed condition or a kick down condition, and when $U \geq U_{S1}$, step ⑩ is performed to store a set value $\frac{1}{2}\cdot\tau$ obtained by $\frac{1}{2}$ times the standard set value $\tau$ temporarily in the sampling period set value storage area in the memory 31 as a sampling period set value $\tau_S$, and the process then proceeds to step ⑦.

If step ④ indicates that $V < V_{S2}$, and when step ⑨ indicates that $U < U_{S2}$, it is determined that the vehicle is respectively in a normal accelerating condition and in a normal decelerating condition, and proceeds to step ⑪, and the standard set value $\tau$ mentioned above is stored as it is in the sampling period set value storage area in the memory 31 as a sampling period set value $\tau_S$, and proceeds to step ⑦.

Figure 6:
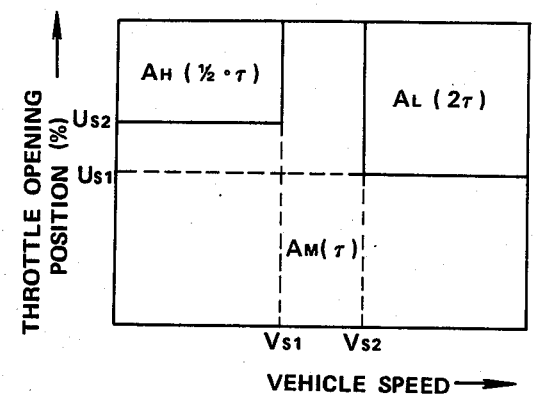
FIGS. 6 and 7 are respectively graphs for explaining the operation of the invention.

As a result, as shown in FIG. 6, based on the vehicle speed V and the throttle opening position U, a region $A_H$ is selected at the time of rapid acceleration or kick down, a region AL is selected at the time of high speed cruising, and a region $A_M$ is selected at the time of normal acceleration/deceleration, and the timer interruption period Tm is changed in accordance with the running condition.

Here, the processing in steps ① to ⑦ is performed by the sampling period selecting means 21 of FIG. 2.

Figure 5A:
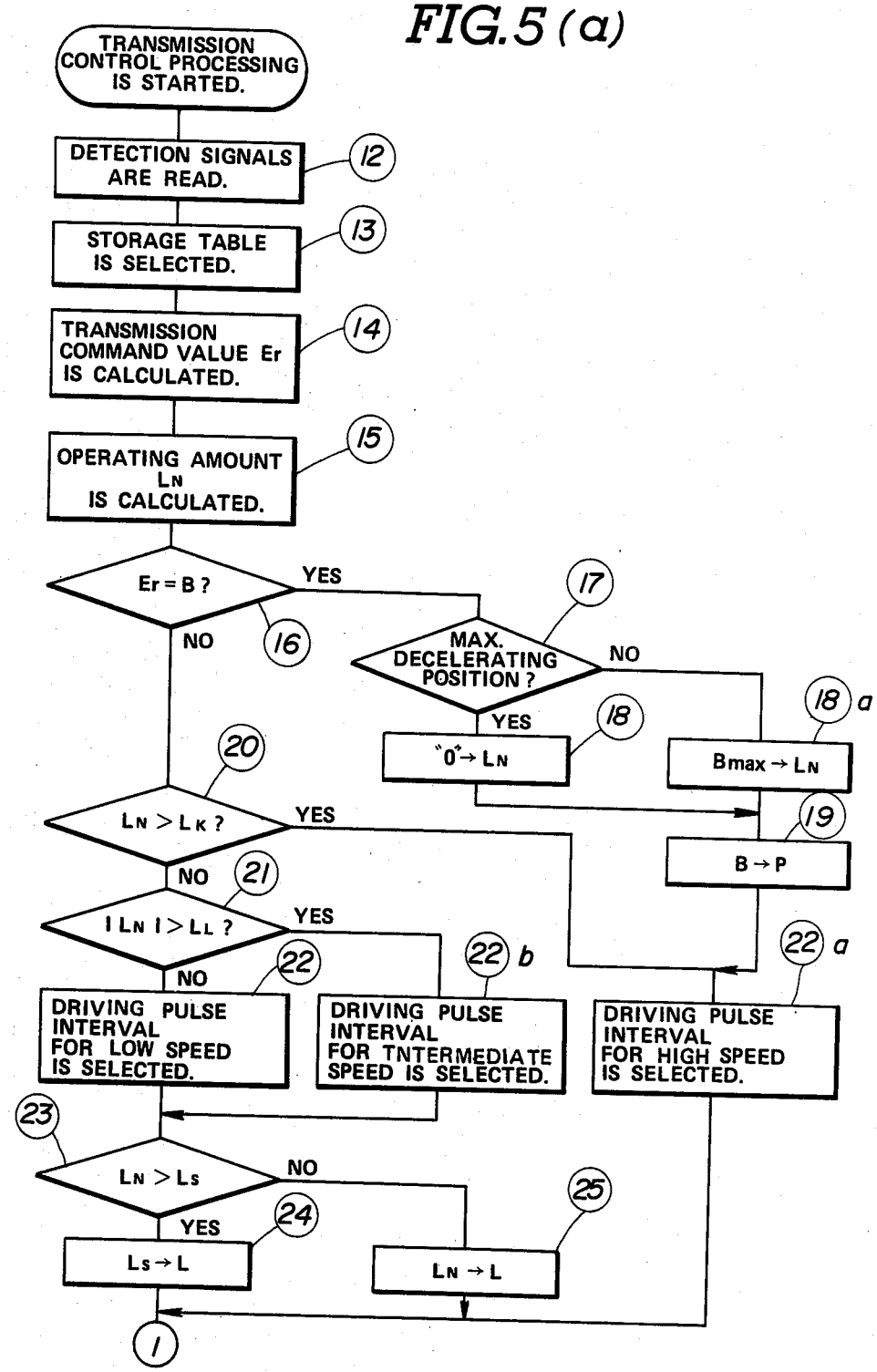
Figure 5B:
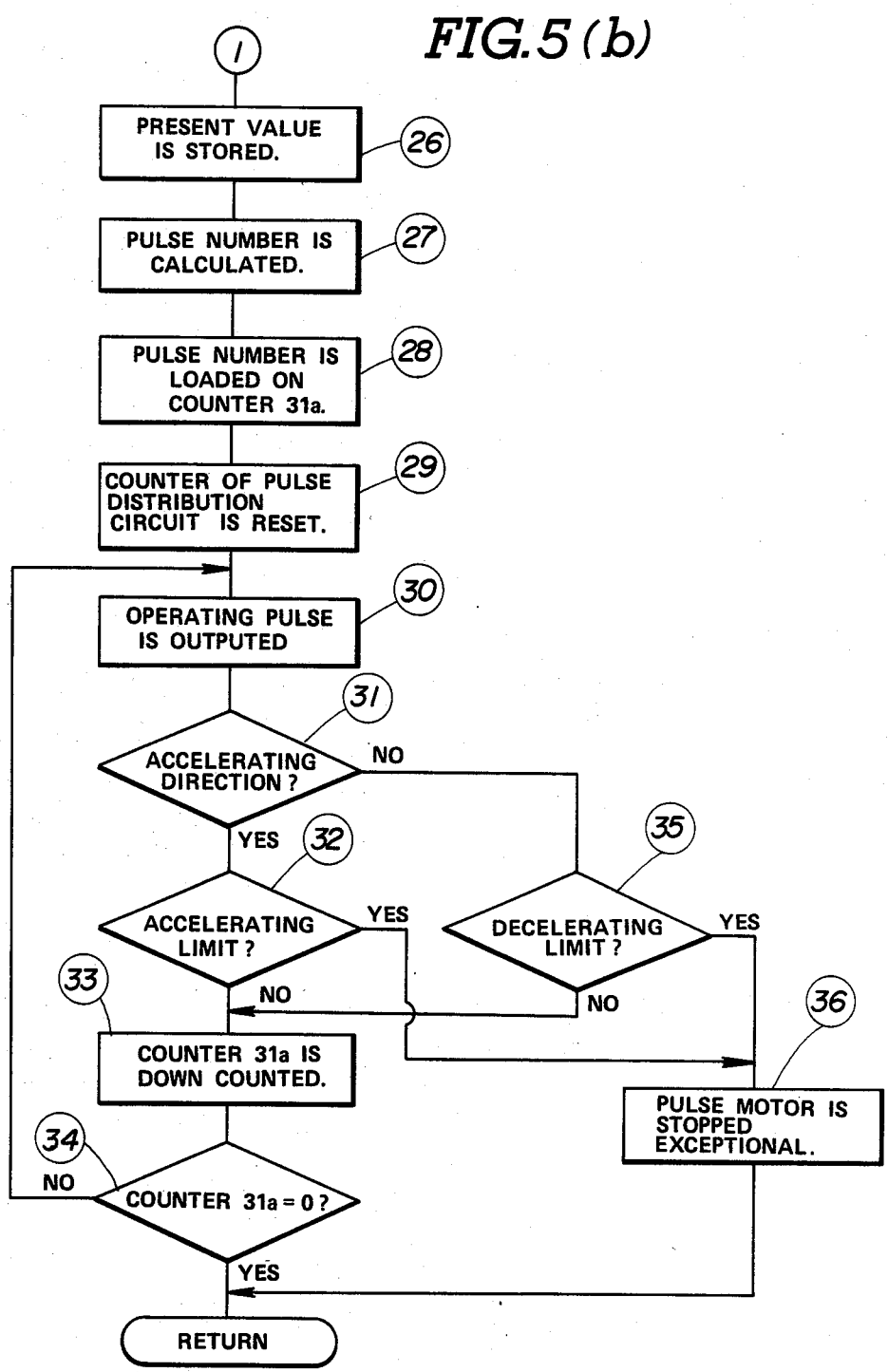

In each timer interruption period selected in the sampling period setting processing described above, a transmission control processing shown in FIG. 5a and FIG. 5b is executed.

More specifically, in step ⑫, the various detection signals from the input amplifier 20 and the shift position detection signal S, etc., are read as the transmission control information, and these signals are stored in a transmission control information storage area.

Next, in step ⑬, in order to calculate a transmission operating amount to shift the transmission ratio to a predetermined transmission ratio, based on the transmission control information, a predetermined transmission control information-transmission operating amount conversion storage table stored beforehand in the memory 31 is selected.

Next, in step ⑭, a transmission command value Er is determined from the selected storage table.

Next, in step ⑮, an operating amount $L_N$ of the pulse motor 12 is calculated from the command value Er and a present position of the pulse motor 12, and the operating amount $L_N$ is stored for updating in an operating amount storage area in the memory 31.

In step ⑯, it is decided whether or not the command value Er mentioned above is a maximum decelerating position B, and when Er=B, proceeds to step ⑰.

In step ⑰, the detection signal BL of the maximum decelerating position detector 19 is read, and it is determined whether or not the detection signal BL is logic value "1", and when it is logic value "1", proceeds to step ⑱.

In step ⑱, the operating amount $L_N$ of the pulse motor 12 is made zero, and this is stored for updating in the operating amount storage area in the memory 31.

Next, in step ⑲, the maximum decelerating position B of the pulse motor 12 is stored for updating in a present value storage area in the memory 31 as a present position P, and the program proceeds to step ㉒a which will be described later.

On the other hand, if the result of step ⑰ indicates that the detection signal BL is logic value "0", the program proceeds to step ⑱a and a decelerating direction maximum value Bmax required to reach the maximum decelerating position B by driving the step motor 12 is stored for updating in the operating amount storage area in the memory 31 as an operating amount $L_N$, and the program proceeds to step ⑲. The processing in steps ⑯ to ⑲ is performed by correcting means, and when the control origin, that is, the maximum decelerating position is deviated, it is corrected to the normal position.

In step ⑳, it is determined whether or not an absolute value $|L_N|$ of the operating amount $L_N$ is equal to or larger than an operating amount set value $L_K$ which is set beforehand. The decision in this case determines whether or not an operating amount of the trunnions 6, 7, that is, a tilting angle variation amount of the power rollers 4, 5 per one transmission operating, for example, as in the case of kick down, is large, and when $|L_N| < L_K$, the program proceeds to step ㉑.

In step ㉑, it is determined whether or not the absolute value $|L_N|$ of the operating amount $L_N$ is equal to or larger than an operating amount set value $L_L$ having a value smaller than the operating amount set value $L_K$ mentioned above. The decision in this case is to determine whether or not the absolute value $|L_N|$ is larger than an operating amount, for example, in the time of general acceleration/deceleration, and when $|L_N| < L_L$, the program proceeds to step ㉒.

In step ㉒, a large driving pulse interval $PW_S$ is selected in order to drive the pulse motor 12 at a low speed, and this is stored in a driving pulse interval storage area in the memory 31, and the program proceeds to transmission processing in step ㉓ and following steps thereto.

On the other hand, when step ⑳ indicates that $|L_N| > L_K$, the program proceeds to step ㉒a and a small driving pulse interval $PW_H$ is selected so that the pulse motor 12 is driven at a high speed, and this driving pulse interval $PW_H$ is stored in the driving pulse interval storage area in the memory 31. The program then skips the operating amount dividing processing, and proceeds directly to the transmission processing in step ㉖ and steps following thereto.

When the decision result in step ㉑ indicates that $|L_N| \geq L_L$, the program proceeds to step ㉒b and an intermediate driving pulse interval $PW_M$ is selected so that the pulse motor 12 is driven at an intermediate speed, and this is stored in the driving pulse interval storage area in the memory 31, and the program proceeds to the transmission processing in step ㉓ and following steps thereto.

In step ㉓, it is determined whether or not an absolute value $|L_N|$ of the operating amount $L_N$ is stored in the operating amount storage area in the memory 31 is equal to or larger than an operating amount est value $L_S$ which is set beforehand. In this case, the operating amount set value $L_S$ is selected to be a maximum value which does not cause a transmission shock but still gives an adequate response, because when the operating amount of the trunnions 6, 7, that is, the tilting angle variation amount of the power rollers 4, 5 for a given transmission change becomes large, transmission shock is caused, and at the same time, the response is degraded. At this time, when $L_N > L_S$, the program proceeds to step ㉔ and the operating amount set value $L_S$ is stored for updating in the operating amount storage area in the memory 31 as a transmission operating amount L, and the program proceeds to the transmission processing of step ㉖ and following steps thereto. When $L_N \leq L_S$, the program proceeds to step ㉕ and the command operating amount $L_N$ is stored as it is in the operating amount storage area in the memory 31 as a transmission operating amount, and the program then proceeds to the transmission control processing in step ㉖ and following steps thereto.

In step ㉖, the present position $P_p$ of the pulse motor 12 is read out from the memory 31, and a command position $P_o$ is calculated by adding the operating amount $L_N$ to the present position $P_p$, and this is stored in a present position storage area in the memory 31, and step ㉗ is then performed.

In step ㉗, based on the operating amount $L_N$ stored in the operating amount storage area, a number of operating pulses of the pulse motor 12 is determined from the storage table, and the number of operating pulses is stored in a predetermined area in the memory 31 temporarily, and in the next step ㉘ the operating pulse number is loaded on an operating pulse counter 31a formed in a predetermined area in the memory 31.

Next, in step ㉙, a distribution counter in the pulse distribution circuit 28 is reset, and in step ㉚ the operating pulse is transmitted to the pulse distribution circuit 28.

Next, in step ㉛, an operating direction of the trunnions 6, 7 is decided, and when it is in an accelerating direction, the program proceeds to step ㉜.

In step ㉜, the detection signal AL is read from the max. accelerating position detector 18, and by deciding whether or not the detection signal AL is logic value "1", it is decided whether or not each of the power rollers 4, 5 has reached the limit position on the accelerating side, and if this limit position has not yet reached, step ㉝ is performed.

In step ×, the operating pulse number counter 31a is down counted by "1", and in step ㉞ it is determined whether or not the count value of the operating pulse number counter 31a is zero. The decision in this case is to decide whether or not the trunnions 6, 7 have reached the command position $P_o$ calculated in step ㉖, and if the command position $P_o$ has not yet reached, the program returns to step ㉚, and the next driving pulse CS is transmitted so that the pulse interval assumes any one of the pulse intervals $PW_H$, $PW_S$ and $PW_H$ depending on the selection in the steps ㉒, ㉒a and ㉒b. On the other hand, if the command position $P_o$ has been reached, the processing is finished and returns to the main program.

When the result of the decision in step ㉛ indicates that the trunnions 6, 7 are being moved in a decelerating direction, the program proceeds to step ㉟ and the detection signal BL of the max. decelerating position detector 19 is read, and it is determined whether or not the trunnions 6, 7 have reached the limit position on the decelerating side. If this limit position on the decelerating side. If this limit position has not yet been reached, the program proceeds to step ㉝; if the limit position has been reached, the program proceeds to step ㊱ and the pulse motor 12 is stopped, and then the interruption processing is finished and returns to the main program.

Here, the processing in steps ⑫ to ⑮ is performed by the transmission operating amount selecting means 22, the processing in steps ⑳, ㉑ and ㉓ is performed by the transmission operating amount decision means 23, the processing in steps ㉒, ㉒a and ㉒b is performed by the driving speed selecting means 24, the processing in steps ㉔ and ㉕ is performed by operating amount modifying means 25, and the processing in steps ㉖ to ㊱ is performed by the transmission control means 26.

Next, the operating will be described. Assuming that the vehicle is stationary, and the ignition switch is off, in this condition the processing shown in FIG. 4 is not executed by the microprocessor 30 in the control apparatus C, and thus the toroidal type infinitely variable transmission T does not perform the transmission operation.

Figure 4:
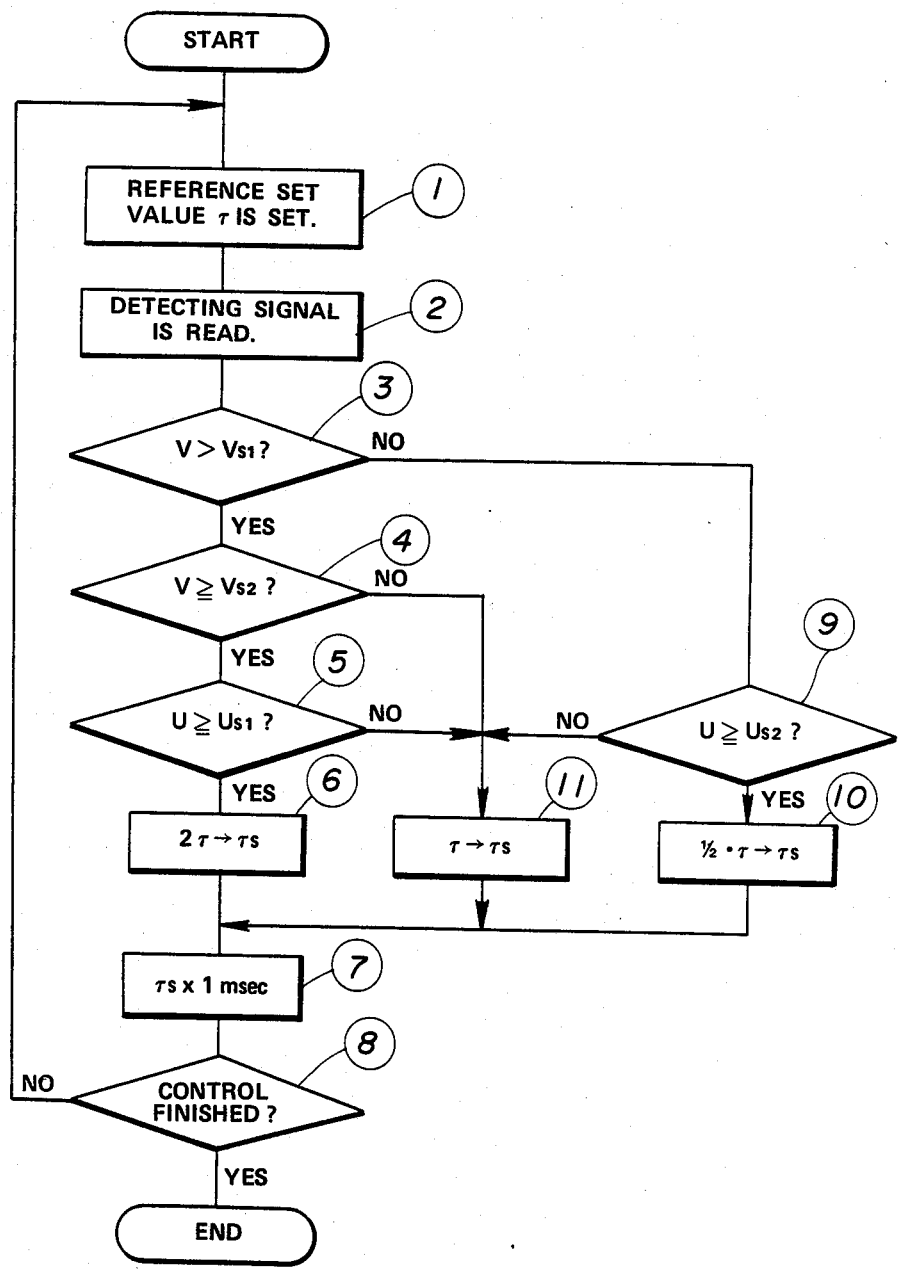
FIGS. 4, 5a and 5b are respectively flowcharts showing processing procedures in the control apparatus.

When the ignition switch is turned on, in the microprocessor 30, the processing of FIG. 4 is executed, and the sampling period for carrying out the transmission based on the various detection signals as the transmission control information is determined.

That is, in step ①, the reference set value $\tau$ which is set beforehand and which decides the sampling period is read, and this is stored in the predetermined storage area in the memory 31.

Next, in step ②, the vehicle speed detection signal V and the throttle opening position detection signal U are read, and these signals are stored respectively as the vehicle detection value and the throttle opening position detection value in the predetermined storage area in the memory 31.

Next, in step ③, whether $V > V_{s1}$ or not is determined. With the vehicle stationary, $V \leq V_{s1}$, the program proceeds to step ⑨.

In step ⑨, it is determined whether or not the throttle opening position detection value U is equal to or larger than the predetermined set value $U_{s2}$. At this time, since the vehicle is stationary, the accelerator pedal is not depressed, and $U < U_{s2}$ so the program proceeds to step ⑪ in which the reference set value $\tau$ is stored as it is in the sampling period set value storage area. In step ⑦, the reference set value $\tau$ stored in the sampling period set value storage area is multiplied by the predetermined time, and the timer interruption period Tm for carrying out the transmission control information is calculated. Then, in step ⑧, when the control is to be continued, the program returns to step ①, and the processing mentioned above is repeated as long as the control is continued.

Thereafter, each time the timer interruption period Tm selected in the sampling period selecting period mentioned above comes round, the timer interruption processing in FIG. 5 is executed.

At this time, since the vehicle is stationary and the engine is idling, and since the clutch is disengaged and the engine is not coupled to the input disk 2 of the infinitely variable transmission T, in the microprocessor 30 in the control apparatus C, that is, in the processing in FIG. 5, the command value is zero, because the vehicle speed is zero.

From this vehicle stopping condition, for example, when the vehicle is started by selecting a drive range, and at the same time, the accelerator pedal is depressed and the clutch is engaged, the sampling period selecting processing in FIG. 4 is executed based on the vehicle speed detection signal V and the throttle opening position detection signal U, and a read period of the detection signals corresponding to the vehicle speed is selected. In other words, in a gradual starting condition although the sampling period is set to the standard set value $\tau$, in a rapid starting condition, the sampling period is set to the set value $\frac{1}{2} \cdot \tau$, that is, $\frac{1}{2}$ times the standard set value $\tau$. Consequently, the processing period of the timer interruption processing in FIG. 5a and FIG. 5b becomes a half of that in the standard condition, and hence frequent processing is executed in order to improve the response.

Accordingly, when the timer interruption processing in FIG. 5a and FIG. 5b is executed each time the selected read period comes round, first, in step ⑫, the shift position detection signal S, powerful-economy mode selection signal M, throttle opening position detection signal U developed by depressing the accelerator pedal, and the vehicle speed signal V of the output disk 3 of the infinitely variable transmission T are read, and these signals are stored as the transmission control information TC in the transmission control information storage area in the memory 31.

Next, in step ⑬, the predetermined transmission control information-transmission command value conversion storage table is selected based on the transmission control information TC stored in the meory 31.

Following this, for the selected storage table, the transmission command value Er which controls the tilting angle $\theta$ of the power rollers 4, 5 by moving the trunnions 6, 7 is determined (step ⑭).

Next, in step ⑮, the predetermined pulse motor operating amount $L_N$ is calculated based on the difference value between the command value Er an the present value $P_p$ stored in the present position storage area, and this is stored for updating in the operating amount storage area in the memory 31.

Next, in step ⑯, it is determined whether or not the command value Er is the maximum decelerating position B. At this time, if the vehicle is in a gradual starting condition, quick transmission to the over-drive is required, and the transmission command value Er assumes a value other than the maximum decelerating position B, and the program proceeds directly to step ⑳ in which it is decided whether or not the transmission operating amount $L_N$ stored in the operating amount storage area exceeds the predetermined set value $L_K$. Here, because the vehicle is in the starting condition, it is decided that the transmission operating amount $L_N$ is larger than the predetermined operating amount set value $L_K$, that is, $L_N > L_K$, and the program proceeds to step ㉒ a and the driving pulse interval $PW_H$ which drives the pulse motor 12 at a high speed is selected, and this is stored in the pulse interval storage area.

Next, skipping the dividing operation processing in steps ㉓ to ㉕, the program proceeds directly to step ㉖ and the command position Po is calculated from the sum of the operating amount $L_N$ mentioned above and the present position Po and this is stored at the present position information $P_p$ in the present position storage area in the memory 31.

Next, in step ㉗, the pulse number which is supplied to the pulse motor 12 is calculated based on the operating amount $L_N$ mentioned above, and then, this is prereset to the counter 31a formed in the memory (step ㉘), and at the same time, the counter in the pulse distribution circuit 28 is reset (step ㉙), and, proceeding to step ㉚, the pulse driving signal CS in transmitted to the pulse distribution circuit 28 in order to operate the pulse motor 12.

Next, in step ㉛, the tilting direction of the power rollers 4, 5, that is, whether the infinitely variable transmission T is on the accelerating side or in the decelerating side is determined, and because the vehicle is accelerating, and the program proceeds to step ㉜ in which it is determined whether or not the accelerating side limit position has been reached. If the accelerating side limit position has not yet been reached, the program proceeds to step ㉝ and the counter 31a is down counted by "1", and in step ㉞ it is decided whether or not the operation of the pulse motor 12 is finished by deciding whether or not the count content of the counter 31a is zero. At this time, since the counter 31a has just been set, the program returns to the step 30 and repeats the operation described above so that the pulse interval becomes the driving pulse interval $PW_H$. As a result, because the pulse motor 12 is driven by the short pulse interval $PW_H$, the rotational speed of the pulse motor 12 becomes high, and the transmission operating is carried out at a high speed.

When the count value of the counter 31a becomes zero, in step 34, the operation of the pulse motor 12 is finished, and the timer interruption processing is finished and returns to the main program.

In this manner, when the pulse motor 12 is rotated by a predetermined amount in accordance with the driving pulse signal CS, the spool control valve body 10e is moved downwardly against the return spring 10h due to the rotation of the pulse motor 12, and the fluid supply pipe 10a and the distribution pipe 10b are brought into communication with each other according to the movement of the spool control valve body 10e. Consequently, hydraulic fluid is supplied to the hydraulic cylinders 9b and 9c, and the trunnions 6 and 7 are respectively moved downwardly and upwardly by a predetermined amount. By this movement of the trunnions 6, 7, the power rollers 4, 5 start to tilt in the accelerating direction. Due to the tilting of the power rollers 4, 5, the trunnions 6, 7 are also rotated, and the precess cam 11 is rotated to lower the control valve roller 11i, and valve spool 10f is also moved downwardly. When the power rollers 4, 5 are tilted to the predetermined tilting angle, passages between the distribution pipe 10b and the fluid supply pipe 10a and between the distribution pipe 10c and the fluid supply pipe 10a are shut off, the movement of the trunnions 6, 7 is stopped.

However, because the movement position of each of the trunnions 6, 7 is deviated from the neutral position, the power rollers 4, 5 are further tilted in the accelerating direction. Under this condition, because valve spool 10f is further moved downwardly, the fluid supply pipe 10a and the distribution pipe 10c are made communicate with each other, and the hydraulic fluid is supplied to the hydraulic cylinders 9a and 9d, and thus the trunnions 6 and 7 are moved respectively in the reverse directions upwardly and downwardly as compared with the previous directions.

When the trunnions 6, 7 return to the predetermined neutral positions, the tilting of the power rollers 4, 5 is stopped, and at this time, because the spool 10f is positioned to make the fluid supply pipe 10a and the distribution pipe 10b communicate with each other, the trunnions 6, 7 are moved beyond the neutral positions to the decelerating side, and due to such movements, the power rollers 4, 5 are tilted in the decelerating side. Thus, the spool 10f is lowered through the precess cam 11, and eventually, because of the mechanical feedback means formed by the trunnion 6, precess cam 11, and spool 10f, the tilting angle θ of the power rollers 4, 5 is controlled in accordance with an operating position selected by the main valve body 10e.

On the other hand, when rapid starting takes place, because the throttle opening is large at a low vehicle speed condition, in the sampling period selecting processing in FIG. 4, the program proceeds from step ③ to step ⑩ via step ⑨, and because the sampling period is set to the set value ½·τ, the processing period od the timer interruption processing in FIG. 5 becomes a half of that in the standard condition, and thus, the processing is executed frequently in order to improve the response. Moreover, in this case, because it is necessary to increase the speed of the engine to a high speed by carrying out a low-geared control, in the processing in FIG. 5a and FIG. 5b, the operating amount $L_N$ selected in step ⑮ becomes equal to or smaller than the preset operating amount set value $L_K$, and the program proceeds from step ⑳ to step ㉑. Because the operating amount L is selected in accordance with the throttle opening position at that time, the program proceeds to step ㉒ (or step ㉒b) depending on the throttle opening, and selects the driving pulse interval $PW_S$ (or $PW_M$) which drives the pulse motor 12 at a low speed (or intermediate speed), and this is stored in the pulse interval storage area. In the transmission control processing in step ㉓ and steps following thereto, the pulse interval of the driving control signal CS which controls the pulse motor 12 becomes long as compared with that in the gradual starting condition, and thus a relatively slow transmission operation is carried out.

Further, when the vehicle running condition is changed from either a gradual or rapid starting condition to a cruise running condition at a relatively high speed, because the vehicle speed and the throttle opening at that time assume large values, in the sampling period selecting processing in FIG. 4, the program proceeds to step ⑥ through steps ① to ⑤, and in this case, since the sampling period τs is set to be the value 2τ, the execution period of the processing in FIG. 5a and FIG. 5b becomes long. As a result, a hunting due to minute variations in the vehicle speed and the throttle opening position during the execution period is prevented and a stable control can be achieved. Furthermore, since the vehicle speed variations and the throttle opening position variations at this time are also reduced, when the timer interruption processing in FIG. 5a and FIG. 5b is executed, in step ⑮ proceeding from step ⑬ through step ⑭, the transmission operating amount $L_N$ is calculated. At this time, since the value of the transmission operating amount $L_N$ is relatively small, the program proceeds to step ㉓ through step ⑳ and step ㉑, and the driving pulse interval $PW_S$ which drives the pulse motor 12 at a low speed is selected, and this pulse interval $PW_S$ is stored for updating in the pulse interval storage area in place of the driving pulse interval $PW_M$ (or $PW_S$, $PW_H$).

Next, in step ㉓, it is determined whether or not the absolute value $|L_N|$ of the transmission operating amount is equal to or larger than the predetermined set value $L_s$. At this time, because the value of the transmission operating amount $L_N$ is relatively small in the high speed cruising condition, the program proceeds to step ㉕ and the transmission operating amount $L_N$ is stored in the transmission operating amount storage area, and then the program proceeds to step ㉖ to execute the control processing.

Accordingly, in the transmission control processing in step ㉖ and steps following thereto, the pulse interval of the driving control signal CS which drives the pulse motor 12 becomes long, and thus relatively slow transmission operation takes place to tilt the power rollers 4, 5 by a predetermined amount. As a result, in this case, at the sacrifice of the response in some degree, the fluctuations of the engine rotational speed and the torque are suppressed and comfortable ride is insured.

When the cruise running condition is changed to an accelerating/decelerating condition wherein usual acceleration or deceleration is carried out instead of rapid acceleration or deceleration, in the sampling period selecting processing in FIG. 4, the program proceeds to step ⑪ through steps ① to ⑤, the sampling period τs is changed to the set value τ of the steady state, as a result, the execution period of the processing in FIG. 5 becomes short, and the response adapted to the accelerating/decelerating is insured. Under this condition, when the processing in FIG. 5a and FIG. 5b is executed, because the value of the command operating amount $L_N$ at this time becomes relatively large, the program proceeds to step ㉒b, through steps ⑳ and ㉑, and the driving pulse interval $PW_M$ which drives the pulse motor 12 at the intermediate speed is selected, and this is stored for updating in the pulse interval storage area in place of the driving pulse interval $PW_S$ mentioned above. Next, in step ㉓, it is decided whether or not the transmission operating amount $L_N$ is equal to or larger than the predetermined set value $L_S$. At this time, because the vehicle is in an accelerating-/decelerating condition, the transmission operating amount $L_N$ is larger, that is, $L_N \geq L_S$, the program proceeds to step ㉔ from step ㉓, and the operating amount set value $L_S$ is stored for updating in the operating amount storage area as the transmission operating amount L, and the program then proceeds to the transmission control processing in step ㉖ and steps following thereto.

As a result, in the transmission control processing in the step ㉖ and steps following thereto, the pulse interval of the driving control signal CS which drives the pulse motor 12 becomes somewhat short, and a relatively quick transmission operation takes place to tilt the power rollers 4, 5 by a predetermined amount. At this time, also, the transmission operating amount L is selected to be the operating amount $L_S$ which prevents the transmission shock and improves the response. Therefore, in this case, it is possible to improve the response, and at the same time, by suppressing the engine rotational speed fluctuations and the torque fluctuations, the transmission operation optimum to the accelerating/decelerating running can be achieved.

Figure 7:
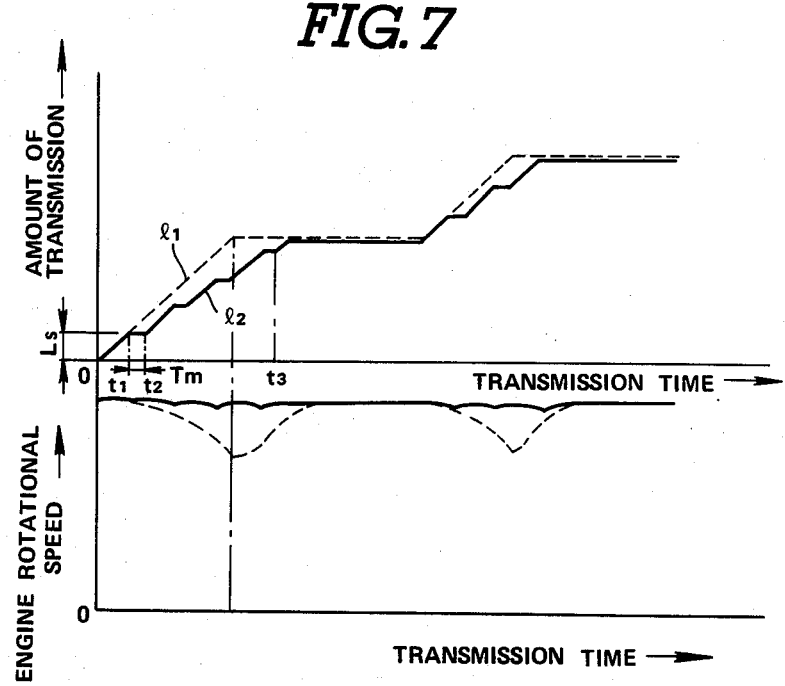

More specifically, as shown in FIG. 7, at (a), when the transmission operating amount $L_N$ obtained from the storage table is larger than the operating amount set value $L_S$ as indicated by the dotted line curve $l_1$, the program proceeds to step ㉔ from step ㉓, and the operating amount set value $L_S$ is stored in the operating amount storage area in the memory 31 as the transmission operating amount L. The program then proceeds to step ㉖ and the command position is calculated based on the operating amount set value $L_S$, and the power rollers 4, 5 are controlled to be positioned at predetermined transmission positions by carrying out a similar operation to that described above. Thus, in the step ㉖ and steps following thereto, the driving pulse number of the pulse motor 12 is set based on the operating amount set value $L_S$, and by driving the pulse motor 12 to a predetermined position in accordance with the driving pulse number to move the trunnions 6, 7, the power rollers 4, 5 are tilted to the tilting angle θ position corresponding to the operating amount set value $L_S$. At a time $t_1$ when one tilting operation is finished, the interruption processing is finished, and thereafter, the operation described in the foregoing is repeated at each timer interruption period Tm selected in the sampling period selecting processing. At a time $t_3$ after repeating the above-mentioned operation for three times, as will be clear from FIG. 7, at (a), the command transmission operating amount $L_N$ calculated in step ⑯ becomes equal to or smaller than the predetermined operating amount set value $L_S$, and the program proceeds to step ㉕ from step ㉓ and stores for updating the command operating amount $L_N$ in the operating amount storage area in the memory 31 as the transmission operation amount $L_N$, the pulse motor 12 is operated to thereby tilt the power rollers 4, 5 to the tilting angle which is the ultimate command transmission position.

In this manner, when the command transmission operating amount $L_N$ is equal to or larger than the operating amount set value $L_S$, by carrying out the transmission operation based on the operating amount set value $L_S$, the fluctuations of the rotational speed of the engine connected to the input side of the transmission T are, as shown in FIG. 7, at (b) by the solid line, are very small. Furthermore, since various detection signals are read each time the transmission operation is carried out according to the operating amount set value $L_S$, and because the command transmission operating amount $L_N$ is calculated by these detection signals, it is possible to improve the response characteristic with respect to the changes in the transmission control information.

In this respect, as shown in FIG. 7, at (a) by the dotted line, when the transmission operation is carried out exceeding the predetermined transmission operating amount set value $L_S$, as shown in FIG. 7, at (b), by the dotted line, speed will be decreased to a great extent in correspondence to the transmission operation. Consequently, there are problems in that the feeling in the vehicle running becomes objectionable, and moreover, since it is impossible to read, during the time in which the transmission operation is being carried out, the detection signals of various detectors which determine the transmission operation, and because an appropriate measure cannot be taken during the time against the variations in the transmission operating amount, the response is degraded.

In addition, when the cruise running condition is changed to the kick down condition for acceleration by reducing the transmission ratio, for example, as in the case of passing another vehicle, the value of the command operating amount $L_N$ becomes equal to or larger than the operating amount set value $L_K$ similarly to the gradual accelerating condition described earlier, and the program proceeds to step ㉒a from step ⑳, the driving pulse interval $PW_H$ which drives the pulse motor 12 at a high speed is selected, and the pulse motor 12 is driven at high speed in accordance with the selected pulse interval $PW_H$. As a result, although the comfortable ride is degraded somewhat, the response can be improved to a great extent, and good drivability under a rapid accelerating condition can be insured.

When the vehicle is brought to a halt, because the transmission command value Er reaches the maximum decelerating position B at this time, the program proceeds to step ⑰ from step ⑯, and it is determined whether or not the detection signal BL of logic value "1" is transmitted from the maximum decelerating position detector 19. A this time, if the detection signal BL of logic value "0" is transmitted from the maximum decelerating position detector 19, the program proceeds to step ⑱a and stores the maximum decelerating operating amount Bmax in the operating amount storage area, and then proceeds to step ⑲ to store the maximum decelerating position B (=0) in the present value storage area. Next, in step ㉒ a, a driving pulse interval $PW_H$ is selected which drives the pulse motor 12 at a high speed, and the program proceeds to the transmission control processing in step ㉗ and following steps thereto, and drives the pulse motor 12 at high speed. When the program has proceeded to step ㊱ from step ㉛ through step ㉟, the pulse motor 12 is stopped and the adjustment of the control origin in the open-loop control is carried out. When the vehicle is stopped, the program proceeds to step (19) from step (17) through step (18), and after the operating amount in the operating amount storage area is made zero, proceeds to step (20) and the control origin adjusting condition is maintained.

The embodiment described above, describes the case in which the tilting of the power rollers 4, 5 of the transmission is accomplished by utilizing the spool valve and the pulse motor. However, in place of the pulse motor, a D.C. motor is also applicable, and in such a case, a rotational speed of the D.C. motor is detected by a speed detector including a tachogenerator, or the like, and by comparing the detected rotational speed with a rotational speed command value, the rotational speed of the D.C. motor may be controlled in accordance with an operating amount.

Further, in the embodiment described above, the present invention is described as applied to a toroidal type infinitely variable transmission. However, the present invention is not limited to such an application, and by changing a rolling contact position of a belt spanned between a pair of pulleys, the present invention is applicable to the transmission ratio control of transmissions other than the infinitely variable transmission. In essence, the present invention is applicable to the type of transmission in which if the transmission ratio is controlled by calculating the transmission operating amount from a conversion table stored in a memory.

We claim:

1. A transmission control apparatus for an infinitely variable transmission comprising:
   transmission control information detecting means for detecting transmission control information such as a throttle opening position command signal or the like;
   transmission operating amount selecting means for selecting a transmission operating amount based on the transmission control information from said transmission control information detecting means;
   transmission operating amount decision means for determining the magnitude of the operating amount selected by said transmission operating amount selecting means, said transmission operating amount decision means including:
   first means for comparing the operating amount ($L_N$) with a first reference value ($L_K$);
   second means for comparing the operating amount ($L_N$), when $L_N < L_K$, with a second reference value ($L_L$) less than the first reference value ($L_K$) and representing an operating amount in normal acceleration and deceleration; and
   third means for comparing the operating amount ($L_N$), when $L_N < L_L$, with a third reference value ($L_S$) representing a maximum operating amount selected to avoid transmission shock while still insuring satisfactory response;
   driving speed selecting means for selecting a driving speed of a driving motor based on a decision result of said transmission operating amount decision means, said driving speed selecting means selecting a high driving speed when $L_N > L_K$, selecting a low driving speed when $L < L_L$, selecting an intermediate driving speed when $L_L < L < L_K$, selecting a driving speed corresponding to the third reference value ($L_S$) when $L_N \times L_S$, and selecting a driving speed corresponding to the operating amount ($L_N$) when $L_N < L_S$; and
   transmission control means for performing the transmission control of said infinitely variable transmission in an open-loop fashion by controlling said driving motor based on the selected driving speed from said driving speed selecting means and the transmission operating amount from said transmission operating amount selecting means.

2. A transmission control apparatus according to claim 1, wherein said transmission operating amount selecting means includes a storage table for calculating the transmission control amount corresponding to the transmission control information.

3. A transmission control apparatus according to claim 1, wherein said infinitely variable transmission is a toroidal type infinitely variable transmission which performs the transmission operation by a hydraulic pressure from a control valve controlled by a driving motor.

4. A transmission control apparatus for an infinitely variable transmission comprising:
   transmission control information detecting means for detecting transmission control information such as a throttle opening position command signal or the like;
   transmission operating amount selecting means for selecting a transmission operating amount based on the transmission control information from said transmission control information detecting means;
   transmission control means for performing the transmission control of said infinitely variable transmission in an open-loop fashion by operating a driving motor based on the transmission operating amount selected by said transmission operating amount selecting means;
   a maximum decelerating position detector provided at a maximum decelerating position of said infinitely variable transmission; and
   correcting means for correcting a control origin of said control means based on a detection signal from said maximum decelerating position detector.

5. A transmission control apparatus according to claim 4, wherein said transmission operating amount selecting means includes a storage table for calculating the transmission operating amount corresponding to the transmission control information.

6. A transmission control apparatus according to claim 4, wherein said infinitely variable transmission is a toroidal type infinitely variable transmission which performs the transmission operation by a hydraulic pressure from a control valve controlled by a driving motor.

* * * * *